(12) United States Patent
Tsukada

(10) Patent No.: US 7,411,690 B2
(45) Date of Patent: Aug. 12, 2008

(54) INFORMATION PROCESSING APPARATUS, PRINT SYSTEM, INFORMATION PROCESSING METHOD, AND PRINT METHOD

(75) Inventor: Tsunehiro Tsukada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 09/994,872

(22) Filed: Nov. 28, 2001

(65) Prior Publication Data
US 2002/0063892 A1 May 30, 2002

(30) Foreign Application Priority Data
Nov. 29, 2000 (JP) .............................. 2000-363008

(51) Int. Cl.
*G06F 15/00* (2006.01)
(52) U.S. Cl. ...................... 358/1.15; 358/1.18; 358/1.9
(58) Field of Classification Search ................ 358/1.13, 358/1.15, 1.16, 1.18, 1.14, 1.1, 400, 403, 358/2.1, 1.9, 1.6; 705/7, 8, 9
See application file for complete search history.

(56) References Cited

U.S. PATENT DOCUMENTS

| | | | | |
|---|---|---|---|---|
| 5,901,286 A | * | 5/1999 | Danknick et al. | 709/203 |
| 5,960,406 A | * | 9/1999 | Rasansky et al. | 705/9 |
| 6,006,281 A | * | 12/1999 | Edmunds | 710/1 |
| 6,020,973 A | * | 2/2000 | Levine et al. | 358/1.15 |
| 6,094,276 A | * | 7/2000 | Yamaguchi et al. | 358/1.15 |
| 6,330,071 B1 | * | 12/2001 | Vidyanand | 358/1.15 |
| 6,788,429 B1 | * | 9/2004 | Clough et al. | 358/1.15 |

OTHER PUBLICATIONS

U.S. Appl. No. 09/994,865, filed Nov. 28, 2001.

* cited by examiner

*Primary Examiner*—Mark Zimmerman
*Assistant Examiner*—Vu Hang
(74) *Attorney, Agent, or Firm*—Fitzpatrick, Cella, Harper & Scinto

(57) ABSTRACT

A print system can be employed by a client without setting up, for each client, a print function for converting distributed data into a print format and without providing a server with individual printers. Print data generated by the server is directly transmitted from the server to a print server.

16 Claims, 18 Drawing Sheets

FIG. 5

| FORM TEMPLATE IDENTIFIER | INDEX | SIZE | VALUE |
|---|---|---|---|
| x x x x x | S1 | 20 | x x x x x |
| | n1 | 12 | 1998 |
| | n2 | 12 | 10 |
| | n3 | 10 | 0 |
| | : : | | |
| | n49 | 10 | 1.5 |
| | n50 | 12 | 30 |
| | n51 | 12 | 7.5 |

FIG. 14

| PRINTER | PRINTER MANAGER |
|---|---|
| PRINTER 904A | PRINTER MANAGER 1301 |
| PRINTER 904B | PRINTER MANAGER 1302 |

FIG. 15

| PRINTER | PRINTER MANAGER | STATUS |
|---|---|---|
| PRINTER 904A | PRINTER MANAGER 1301 | OK |
| PRINTER 904B | PRINTER MANAGER 1302 | NG |

FIG. 19

| PROGRAM CODE CORRESPONDING TO FLOWCHART IN FIG. 6 |
| PROGRAM CODE CORRESPONDING TO FLOWCHART IN FIG. 7 |
| PROGRAM CODE CORRESPONDING TO FLOWCHART IN FIG. 8 |
| PROGRAM CODE CORRESPONDING TO FLOWCHART IN FIG. 10 |
| PROGRAM CODE CORRESPONDING TO FLOWCHART IN FIG. 12 |
| PROGRAM CODE CORRESPONDING TO FLOWCHART IN FIG. 16 |
| PROGRAM CODE CORRESPONDING TO FLOWCHART IN FIG. 17 |
| |

INFORMATION PROCESSING APPARATUS, PRINT SYSTEM, INFORMATION PROCESSING METHOD, AND PRINT METHOD

BACKGROUND OF THE INVENTION

1. Field of the Invention

The present invention relates to network print systems for generating form print data and printing forms over a network.

2. Description of the Related Art

Since the Internet has rapidly developed and the number of Web servers has increased, more and more business activities have been performed using Web tools and technologies. A personal computer (PC) connected to a network only requires a Web browser that can display and input information in order to perform business activities using the Web browser and a Web server. Information required to perform business activities is exchanged between the Web server and the Web browser.

The Web server receives information from the Web browser. The information is processed in the Web server, and the processed information is retransmitted to the Web browser. The Web server displays the processed information. The operation is repeated to perform a business activity.

Business activities performed by the Web browser and the Web server have a problem with printing that is essential for business activities. In particular, beautifully formatted printing for printing forms and the like cannot be performed.

Generally the Web browser provides a print function. However, the function only allows an image displayed on the Web browser to be printed by a printer under the control of the Web browser (or a printer under the control of a computer on which the Web browser is running) to produce a hard copy. It is difficult for this type of printing to give an appropriate page break for an image which is larger than the paper size or for an image extending over a plurality of pages. As a result, the printing often fails to satisfy a user with the outcome.

SUMMARY OF THE INVENTION

In order to solve this problem, the following print system can be employed. In this print system, a print system server which has the Web server generates print data (for example, form print data) in response to an instruction from the Web browser and distributes the generated print data to a client on which the Web server is running. In this print system, the server generates print data in response to individual instructions and successively transmits the data to clients.

In particular, the print system performs printing in accordance with one of the following methods: (1) and (2). (1) Data is distributed to each client that has requested printing. A user calls a print function (such as a printer driver). The print function converts the data into a printable format and transmits the data to a printer. For example, an HTML document read by the Web browser is printed using the print function of the Web browser. (2) The server directly transmits data to a printer. The server manages information on each printer capable of outputting print data. An example includes the Internet Printing Protocol.

In (1), for each client, it is necessary to set up the print function for converting distributed data into a printable format, and so the managing cost is increased. It is thus necessary to enable the print system to be easily used without providing each client with the print function.

In (2), the server is required to manage an output address for each printer, and it is thus difficult to deal with installations of additional printers or changes in printers. It is desirable that a printer at each client side output data so that it becomes unnecessary to provide the server with individual printers for clients.

In order to achieve the foregoing objects, a print system according to an aspect of the present invention has an information processing apparatus and a print server for causing a printer to perform printing. The print system includes a generating unit for generating, in response to a request from an external apparatus, print data corresponding to a screen displayed on the external apparatus; and a transmission control unit for controlling transmission so that the print data generated by the generating unit is transmitted from the information processing apparatus to the print server.

The print system may further include a specifying unit for specifying, in response to the request from the external apparatus, a template for generating the print data corresponding to the screen displayed on the external apparatus and data to be inserted into the template. The generating unit may generate the print data based on the template and the data specified by the specifying unit.

The screen may include a page screen displayed on a Web browser. The request from the external apparatus may be communicated between the Web browser on the external apparatus and a Web server on the information processing apparatus.

The print system may further include a determining unit for determining, when the print server can transmit data to a plurality of printers, which printer is to be used to perform printing by analyzing the request from the external apparatus. The transmission control unit may control transmission so that the print data and information designating the printer determined by the determining unit is transmitted.

The print system may further include an obtaining unit for obtaining, when the print server can transmit data to a plurality of printers, status information on the plurality of printers; and a selection control unit for prohibiting, based on the status information, an unusable printer from being selected by the external apparatus.

Further objects, features, and advantages of the present invention will become apparent from the following description of the preferred embodiments with reference to the attached drawings.

BRIEF DESCRIPTION OF THE DRAWINGS

FIG. 5 shows a table of variable data to be embedded in graphic data.

FIG. 14 shows a table managed by a printer information storage unit.

FIG. 15 is an illustration of a business activity page on which a printer can be selected.

FIG. 19 is an illustration of a memory map of a program loaded into a memory and executable by a central processing unit (CPU).

DESCRIPTION OF THE PREFERRED EMBODIMENTS

Form print System

Figure 1:
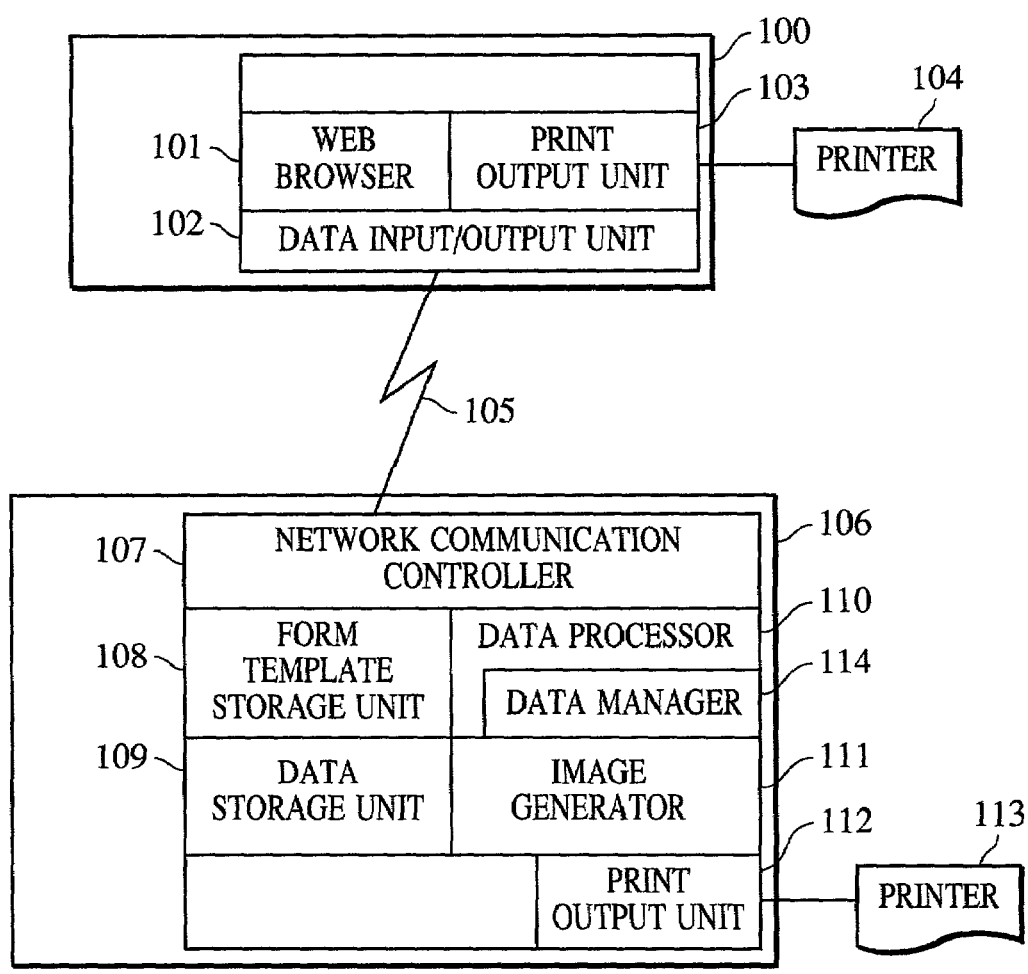
FIG. 1 is a function block diagram of a form print system.

FIG. 1 is a function block diagram of a form print system. An information processing apparatus 100, such as a PC, is a client in the form print system (hereinafter referred to as a "client"). A Web browser 101 is an application program for displaying document data files (Web documents) coded in HTML (Hypertext Markup Language) or the like. The Web browser 101 displays a Web document received from a Web server. Also, the Web browser 101 enables a user to input data on a screen in accordance with HTML and retransmits the inputted data to the Web server. The Web browser 101 obtains a Web document from the Web server in accordance with an inputted URL (Universal Resource Locator).

A data input/output unit 102 inputs data to and outputs data from a server in the form print system (hereinafter referred to as a "server"). The data input/output unit 102 exchanges data with a server 106 over a network 105 such as a telephone line or a local area network (LAN). The data input/output unit 102 performs processing in layers below HTTP (Hypertext Transport Protocol). A print output unit 103 converts print data in a predetermined format into a data format that is in accordance with a printer-dependent output format and outputs the data from a printer 104. The print output unit 103 also causes the printer 104 to print data that is in a printer-dependent output format and that is received from the server or the like.

In response to an instruction from the Web browser 101, the print output unit 103 converts an image displayed on the Web browser 101 into standard print data. The print output unit 103 is generally referred to as a printer driver.

The printer 104 and a printer 113 are provided. The network 105 interconnects the server 106 and the client 100. For example, the network 105 includes a LAN, the Internet, or a wireless network. In the description, the network 105 is in accordance with a communication protocol on the Web such as TCP/IP (Transmission Control Protocol/Internet Protocol) or HTTP protocol.

The server 106 is an information processing apparatus. A network communication controller 107 has a Web server function. The Web server function supports HTTP and FTP (File Transfer Protocol). In response to a request, the Web server function transmits document data files (Web documents), which are designated by URLs (Uniform Resource Locators) and which are coded in HTML, or the like, to the client 100 on the network 105.

A form template storage unit 108 stores form templates (or form template data) indicating printing forms for use in form printing. Each Web document read from the server 106 by the client 100 has its own form template. When the server 106 transmits a Web document associated with a form template to the client 100, the server 106 stores an identifier that corresponds to the Web document. For each form template stored in the form template storage unit 108, the identifier of the corresponding Web document is associated as a form template identifier.

A data storage unit 109 is formed of a database and stores various business activity data. The stored data includes data organized in advance into the database and data input from the Web browser 101. A data processor 110 performs data processing in accordance with application programs for various business activities.

An image generator 111 generates form print data in accordance with a predetermined format. The image generator 111 creates the form print data in a predetermined format that can be analyzed by a print output unit 112 by combining a form with data to be overlaid on the form. The print output unit 112 converts data created by the image generator 111 into a format that can be output by a printer. The print output unit 112 is generally referred to as a printer driver.

A data manager 114 efficiently stores the created form print data and transmits the storage location to the client 100. In particular, the data manager 114 generates new form print data for a changed print form and reports the change to the user.

Figure 3:
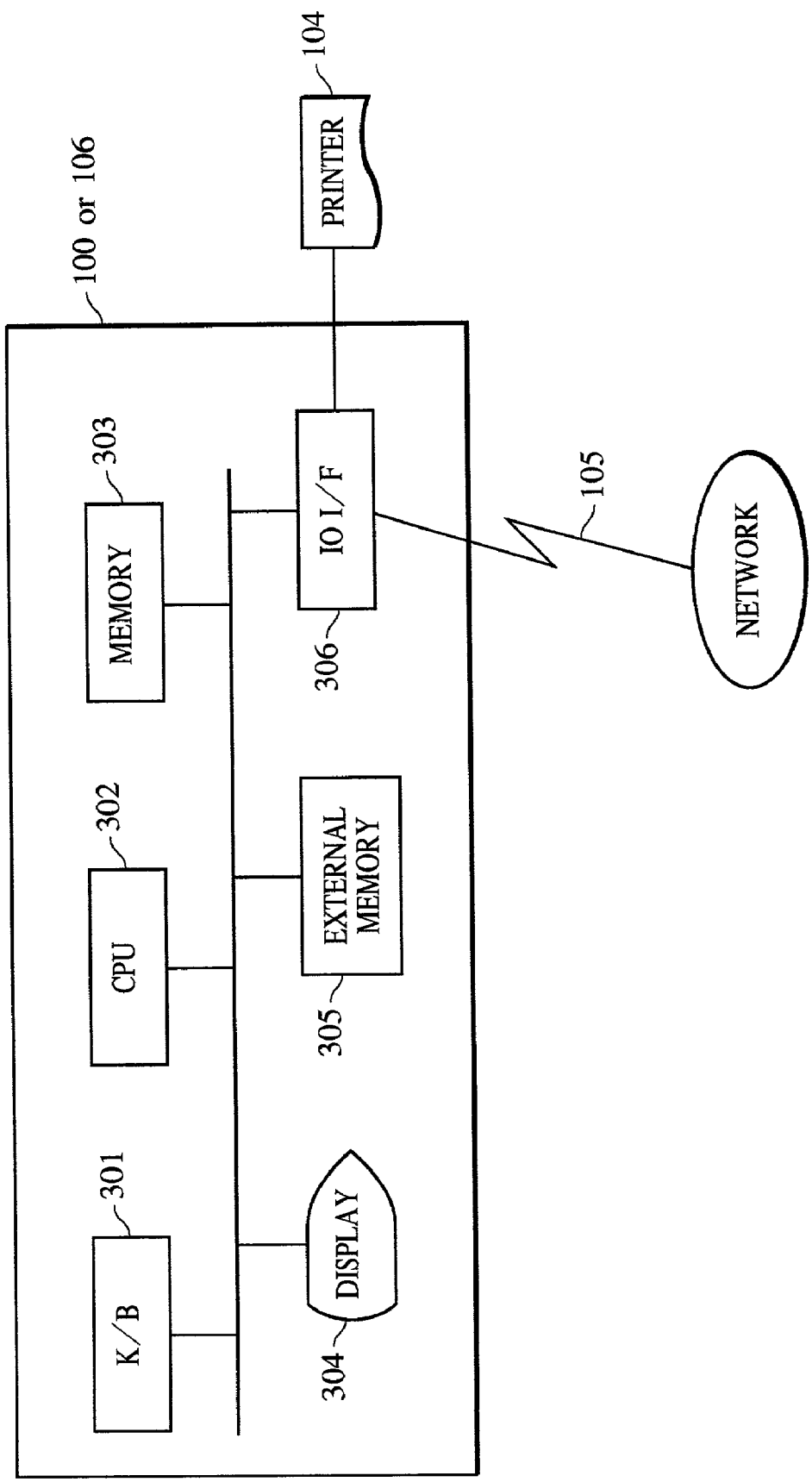
FIG. 3 is a hardware block diagram of a client and a server.

FIG. 3 is a hardware block diagram of the client 100 and the server 106. For the units 102, 103, 107, 110 to 112, and 114 in FIG. 1, the corresponding programs are loaded into a memory 303, and the programs are executed by a CPU 302 of the computer. The programs, the data storage unit 109, and the form template storage unit 108 are stored in an external memory 305 such as a hard disk. The external memory 305 can be implemented by a removable storage medium such as a floppy disk (FD) or a CD-ROM. A display 304 displays the Web browser 101 and images. An I/O interface 306 is a section that establishes connections with external devices such as the network 105 and the printer 104. The user enters necessary information using a keyboard or a pointing device 301.

Display on Web Browser

A print instruction from the Web browser 101 will now be described. The data processor 110 communicates with the data input/output unit 102 to accept and analyze data input by the Web browser 101, to perform data retrieval in accordance with the accepted data, and to return the retrieval result to the data input/output unit 102. The Web browser 101 displays buttons in accordance with a Web document distributed by the data processor 110. When the user presses the buttons, various requests are transmitted to the server 106 through the data input/output unit 102. The buttons are displayed on the display 304 of the computer. The buttons are selected or pressed by entering information using the pointing device such as a mouse or the keyboard 301.

Figure 2:
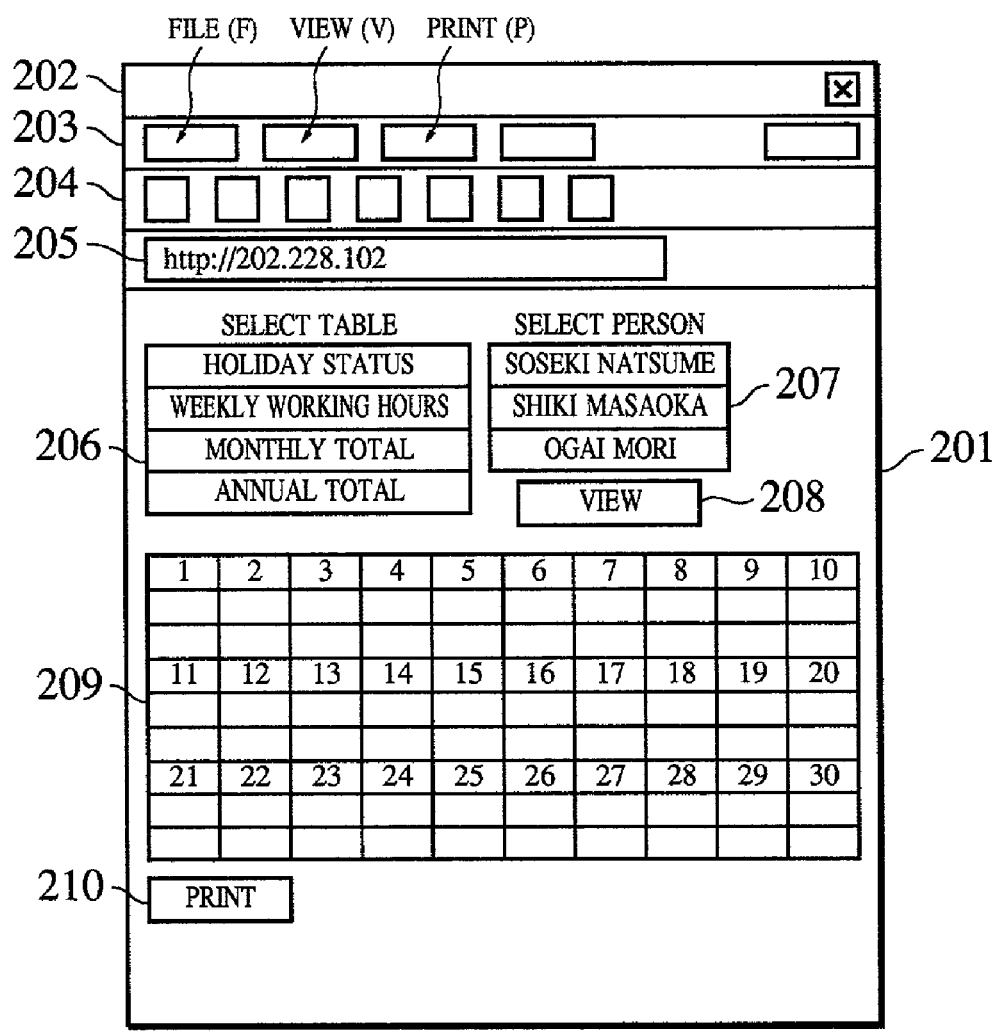
FIG. 2 is an illustration of a business activity page displayed on a general Web browser.

In particular, a print button in the form print system is provided in an image display region on the Web browser 101. FIG. 2 illustrates a business activity page displayed on the general Web browser 101. A window 201 is a window of the Web browser 101 displayed on a monitor or a display 304 of the client 100. A window title is displayed in an area 202. Commands of the Web browser 101 are displayed in areas 203 and 204. A command for printing an image displayed on the Web browser 101 is displayed in one of the two areas 203 and 204. In a text field 205, the user enters a server address (such as a URL) to be accessed.

In fields 206 and 207, the user can select each item. When a view button 208 is pressed, the items selected by the user in the fields 206 and 207 are transmitted to the server 106, and the user waits for a response from the server 106. The server 106 generates form display data based on the selected form in the field 206 and the selected name in the field 207 and transmits the generated data to the client 100. The Web server displays a form image 209 based on the form display data. In FIG. 2, the server 106 searches the data storage unit 109 and obtains data on this month's working hours for Mr. Shiki Masaoka. Based on the retrieved data, the server 106 generates form display data (in this case, a Web document for displaying a form image) and transmits the form display data to the client 100. The monthly form is displayed as the image 209 on the Web browser 101. A print button 210 is provided in the form print system.

When the client 100 reads a form page from the server 106, the Web browser 101 is activated on the client 100. As shown in FIG. 2, when the user enters "http://202.228.102", the Web document including the fields 206 to 210 is transmitted from the server 106 to the Web browser 101.

Generation and Outputting of Print Data by Server

The operation in response to pressing the print button 210 will now be described. In printing, a document to be printed is created by inserting data into a printing form template associated with the format identifier. When the print button 210 is pressed, information indicating that the print button 210 is pressed is transmitted to the server 106. Based on the identifier added to the Web document (form page) which has already been transmitted to the client 100 requesting printing, the server 106 searches the form template storage unit 108 for the form template. Each form template is stored so as to be retrievable by a format identifier.

Figure 4:
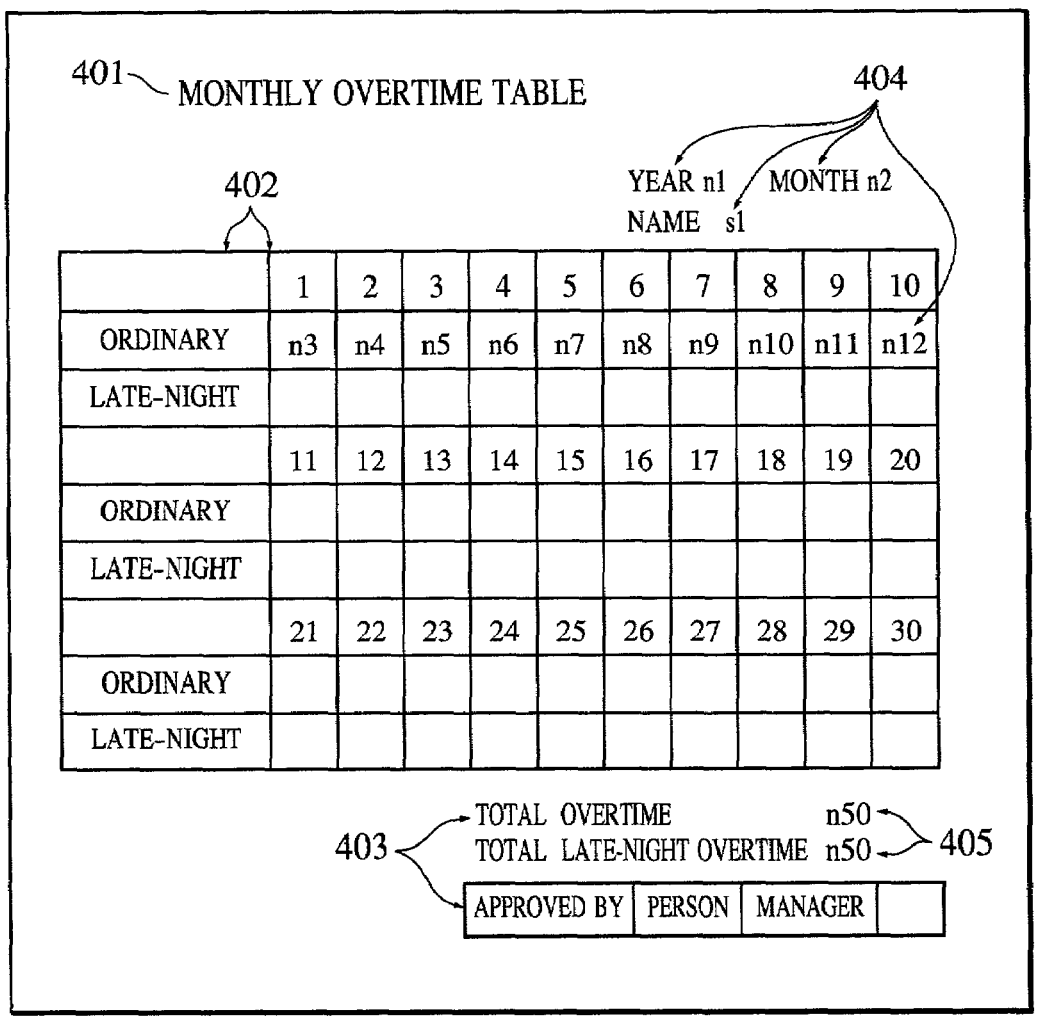
FIG. 4 is an illustration of an example of a form template for use in printing.

FIG. 4 illustrates an example of a form template for use in printing. Graphic data in the form template is classified into fixed data and variable data. The fixed data includes a character string 401 expressing a form title, numerals 402 expressing grids and dates, and character strings and grids 403. Values (form data) retrieved from a database or the like are embedded in s1 and n1 to n12 in an area 404 and in n50 and n51 in an area 405.

FIG. 5 shows a table of variable data to be embedded in the graphic data shown in FIG. 4. The table is prepared for each form template. A form template identifier 504 is added so that the user knows which form template is used. In the table shown in FIG. 5, for each piece of variable data S1 and n1 to n51, an index 501 of the variable data, character size 502 to be displayed by the variable data, and an actual value (or a number sequence or a character string) 503 of the variable data are stored. The form print data is created by merging the form template shown in FIG. 4 with the values of variable data shown in FIG. 5.

Figure 6:
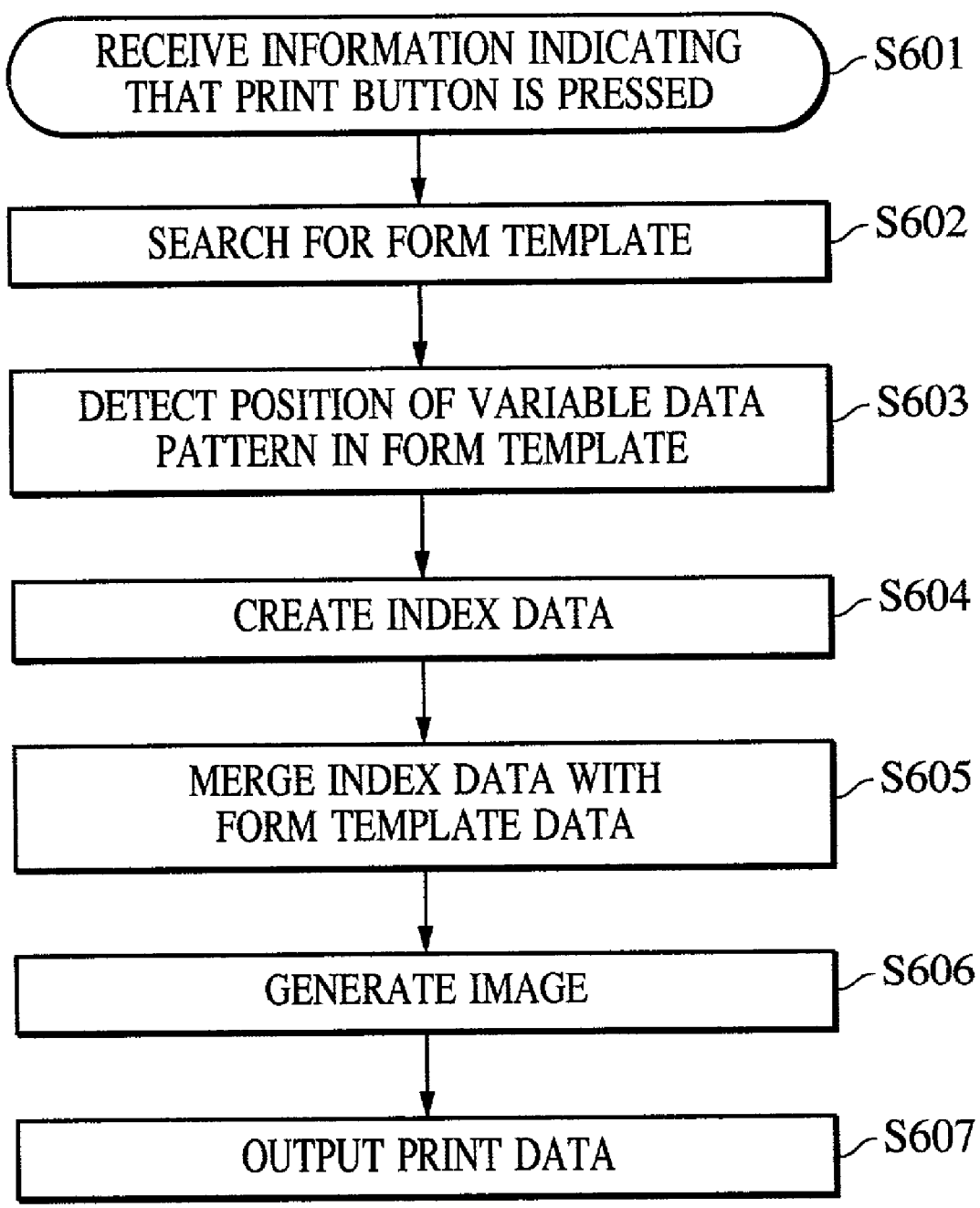
FIG. 6 is a flowchart of a process of generating and outputting form print data by the server.

FIG. 6 shows a process of generating and outputting the form print data by the server 106. The process is performed by the server 106 when the server 106 receives information indicating that the print button 210 is pressed. In this process, steps S601 to S604 are performed by the data processor 110; steps S605 and S606 are performed by the image generator 111; and step S607 is performed by the printer 113.

In step S601, the server 106 receives information indicating that the print button 210 is pressed. In step S602, the process searches for a form template to be used. Since the identifier of the Web document which has already been transmitted to the client 100 is stored, the form template to be used can be retrieved based on the identifier.

In step S603, the process detects the position at which variable data is to be embedded in the retrieved form template. In step S604, the process creates index data. Specifically, in accordance with the index, the process writes the value of the variable data in the table shown in FIG. 5 so as to be adjusted to the position of the variable data, which is detected in step S603. Accordingly, the index data in which the variable data portion is coded is created.

In step S605, the image generator 111 merges the fixed data portions of the form template retrieved in step S602 with the index data created in step S604. In step S606, the image generator 111 creates, from the data created in step S605, form print data coded in an actual image format, that is, a format that can be analyzed by the print output unit 112.

In step S607, the print output unit 112 converts the form print data created in step S606 into a print image coded in a page description language, which can be output from a printer, and the print output unit 112 outputs the data to a print spool. Thus, the print image based on the form print data is printed by the printer 113.

Generation and Transmission of Print Data by Server

Figure 7:
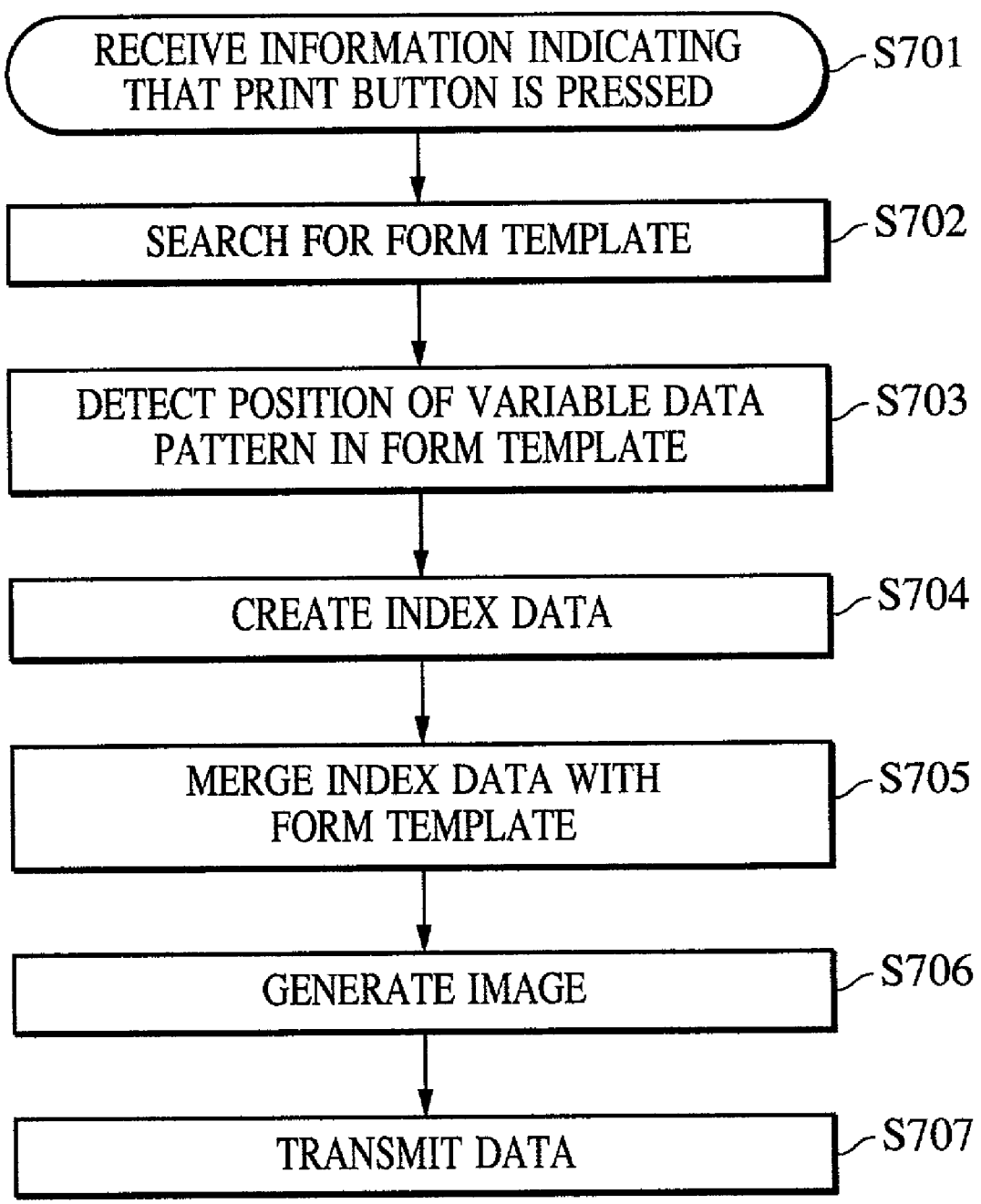
FIG. 7 is a flowchart of a process of generating and outputting form print data by the server.

FIG. 7 shows a process of generating the form print data and transmitting the form print data from the server 106 to the client 100. The process is performed by the server 106 when the server 106 receives information indicating that the print button 210 is pressed. In this process, steps S701 to S704 are performed by the data processor 110; steps S705 and S706 are performed by the image generator 111; and step S707 is performed by the network communication controller 106. Printing is performed by the printer 104.

In step S701, the server 106 receives information indicating that the print button 210 has been pressed. In step S702, the process searches for a form template to be used. Since the identifier of the Web document, which has already been transmitted to the client 100, is stored, the form template to be used can be retrieved based on the identifier.

In step S703, the process detects the position at which variable data is to be embedded in the retrieved form template. In step S704, the process creates index data. Specifically, based on the index, the process writes the value of the variable data in the table shown in FIG. 5 so as to be adjusted to the position of the variable data, which is detected in step S703. Thus, the index data in which the variable data portion is coded is created.

In step S705, the image generator 111 merges the fixed data portions of the form template obtained in step S702 with the index data created in step S704. In step S706, the image generator 111 creates form print data coded in an actual image format, that is, a format that can be analyzed by the print output unit 112.

In step S707, the process transmits the form print data created in step S706 to the client 100. In order to simplify the description, the data is transmitted to the client 100 in step S707. Optionally, the created form print data is not transmitted to the client 100 and optionally, a URL of a data file containing the created form print data is transmitted to the client 100. The client 100 uses the URL, which is received by the Web browser 101, to automatically request the data file using FTP (not HTTP) and receives the data file from the server 106.

Reception and Outputting of Print Data by Client

Figure 8:
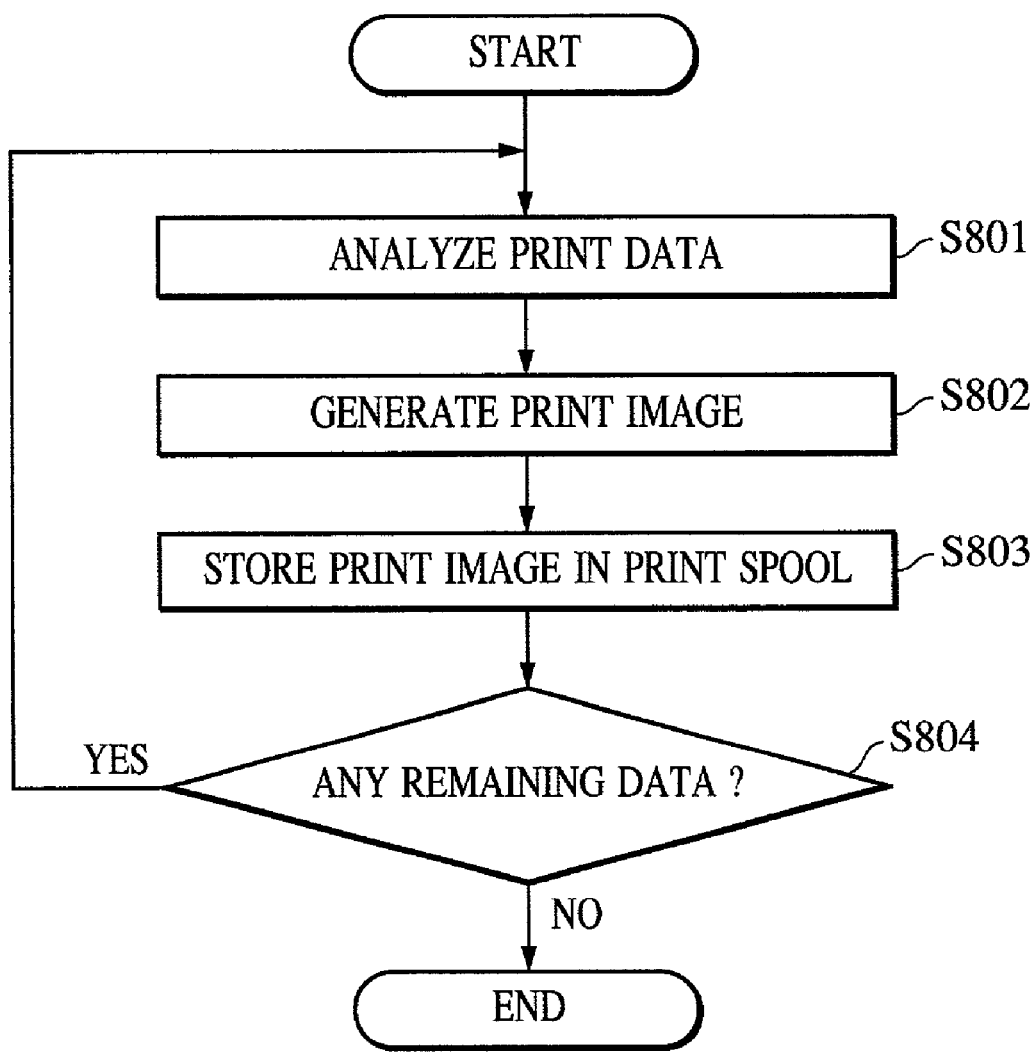
FIG. 8 is a flowchart showing a process performed by the client in response to reception of the form print data transmitted from the server.

FIG. 8 shows a process performed by the client 100 in response to reception of the form print data transmitted from the server 106 in step S707 in FIG. 7.

In step S801, the print output unit 103 analyzes the received form print data and specifies a printer suitable for the received form print data. For example, the printer 104 in FIG. 1 is selected. Based on the analysis result, in step S802, the print output unit 103 generates a print image, which can be output by the printer 104. In step S803, the print image is stored in a print spool. The printer 104 sequentially prints the print image. In step S804, the process determines whether or not there is any remaining data to be analyzed. If the determination is affirmative, the process returns to step S801. The foregoing process is repeated until the entirety of the received form print data is analyzed and is converted into print images.

Accordingly, the client 100 uses the Web browser 101 to specify output data and to perform printing in an appropriate format. Since a form is printed using a form template created for printing, an image created by the Web browser 101 can be output as high-quality printed matter, which is different from simply printing a displayed form. At the user's convenience, a high-quality form can be printed by the printer at either the server 106 side or the client 100 side. Since only the server 106 stores the form templates and combines data with the form templates, the client 100 only needs a commercial Web browser to print a high-quality form using the server 106. Thus, the burden on the client 100 is light, and an inexpensive low-throughput PC or a personal digital assistant (PDA) with a Web browsing function can be used.

Outputting of Form print data by Print Server

In the above-described embodiment, there have been described cases in which the form print data is output by the printer 104 connected to the client 100 or the printer 113 connected to the server 106. In many office environments, a print server is provided in order to enable a plurality of computers to share a single printer, and the print server manages printing by the printer.

In the following example, the client 100 requests the server 106 to create form print data in response to an instruction from the user. The server 106 creates the form print data and transmits the form print data to the print server. The print server outputs the form print data to the printer.

Figure 9:
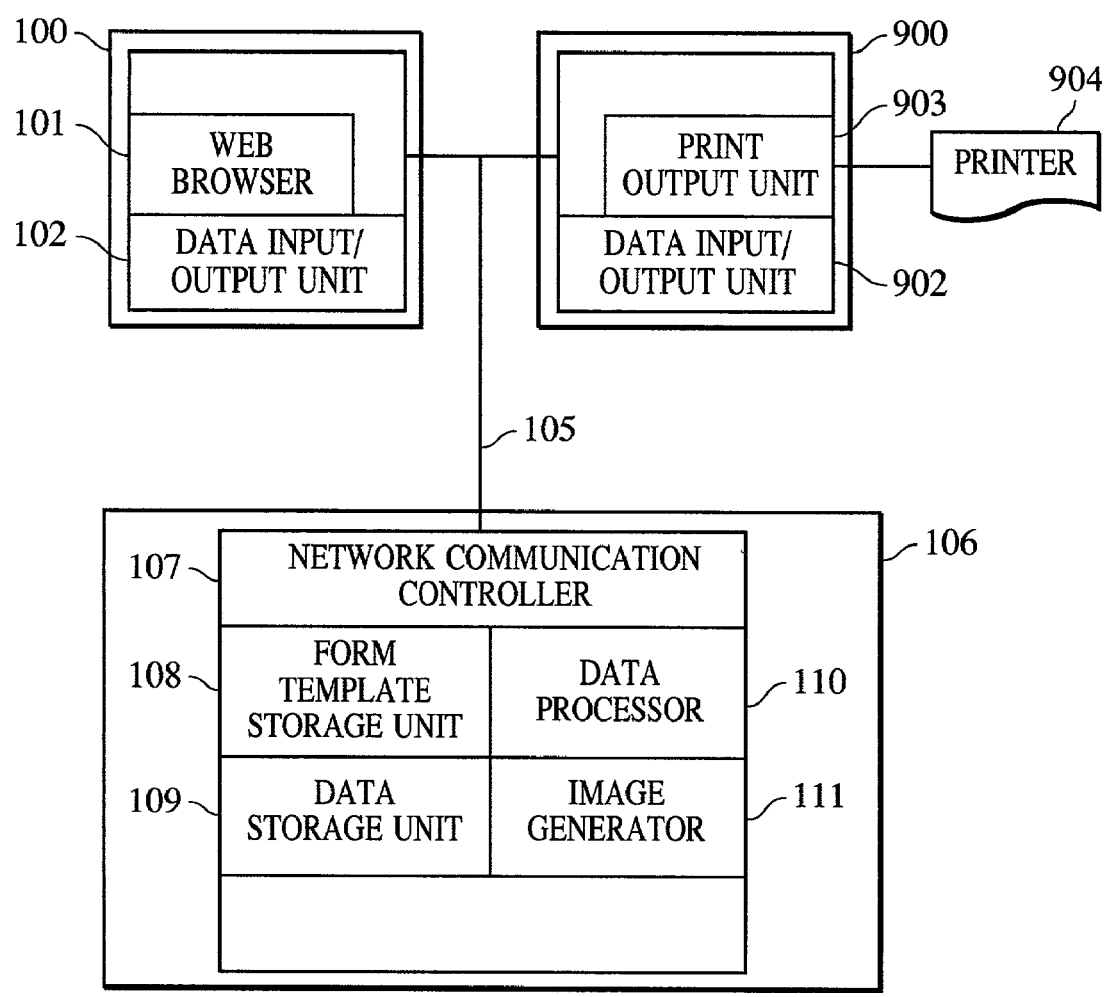
FIG. 9 is a function block diagram of a form print system provided with a print server.

FIG. 9 is a function block diagram of a form print system in which the print system shown in FIG. 1 is provided with a print server. The units 100 to 102 and 105 to 111 are the same as those in FIG. 1.

A print server 900 and the client 100 are installed in the same office environment and are connected to the same LAN. The print server 900 manages a printer 904.

A data input/output unit 902 exchanges data with the server 106 over the network 105. The data input/output unit 902 performs processing in layers below HTTP. A print output unit 903 converts print data coded in a predetermined format into a data format which is in accordance with a printer-dependent output format, and the printer 904 outputs the print data. Also, the print output unit 903 transfers data which is received from the server 106 and which is in the printer-dependent output format to a spool, and the printer 904 prints the data.

A hardware block diagram of the print server 900 is the same as that shown in FIG. 3.

Figure 10:
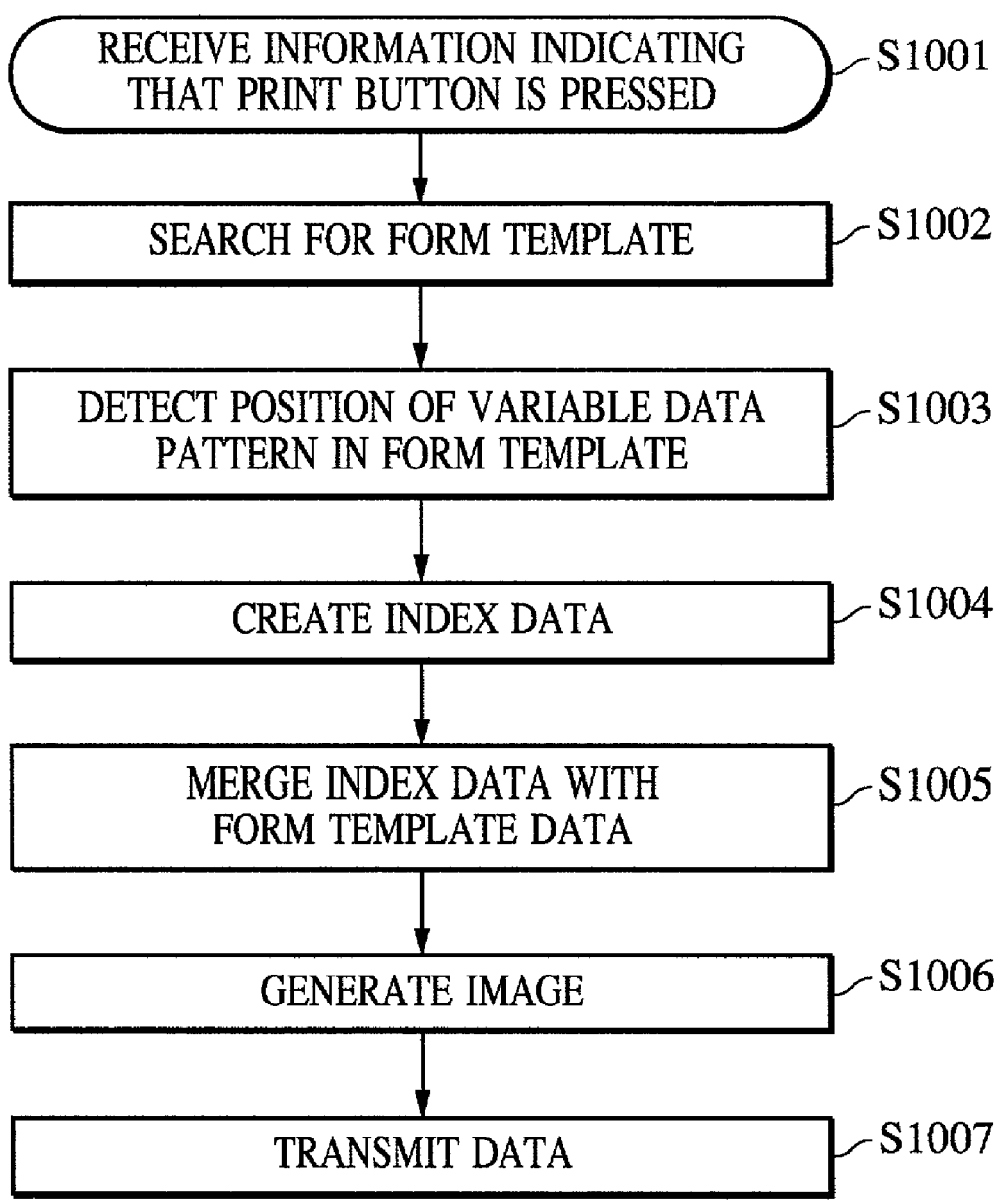
FIG. 10 is a flowchart showing a process of generating form print data and transmitting the form print data from the server to the print server.

In the above-described form print system, the operation of the print server 900 when the print button 210 shown in FIG. 2 is pressed is described. FIG. 10 shows a process of creating form print data and transmitting the form print data by the server 106 to the print server 900. The process is performed by the server 106 when the server 106 receives, from the client 100, information indicating that the print button 210 is pressed. In the process, steps S1001 to S1004 are performed by the data processor 110; steps S1005 and S1006 are performed by the image generator 111; and step S1007 is performed by the network communication controller 106.

In step S1001, the server 106 receives information indicating that the print button 210 is pressed from the Web browser 101. In step S1002, the process searches for a form template to be used. Since the identifier of the Web document which has already been transmitted to the client 100 is stored, the form template to be used is retrievable based on the identifier.

In step S1003, the process detects the position at which variable data is to be embedded in the retrieved form template. In step S1004, the process creates index data. Thus, the index data in which the variable data portion is coded is created.

In step S1005, the image generator 111 merges the fixed data portions of the form template obtained in step S1002 with the index data created in step S1004. From the data generated in step S1005, the image generator 111 generates in step S1006 form print data coded in an actual image format, that is, a format that can be analyzed by the print output unit 112.

Figure 11:
FIG. 11 shows a table illustrating the relationship between clients and print servers.

In step S1007, the process transmits the form print data generated in step S1006 to the print server 900. The network communication controller 107 selects the print server 900 in accordance with the client 100. For example, when there is a plurality of clients, a print server is set up for each client. In accordance with the setting, the print server is selected. FIG. 11 shows a table of the relationship between clients and print servers. For each client, a network address 1101 of the client and a network address 1102 of the corresponding print server are stored.

In response to the information received in step S1001, the data processor 110 determines the network address of the client 100 which has transmitted the information. Using the determined network address, the data processor 110 searches the table in FIG. 11 for the network address of the print server 900. In step S1007, the data processor 110 transmits the form print data to the determined network address of the print server 900.

Reception and Outputting of Print Data by Print Server

Figure 12:
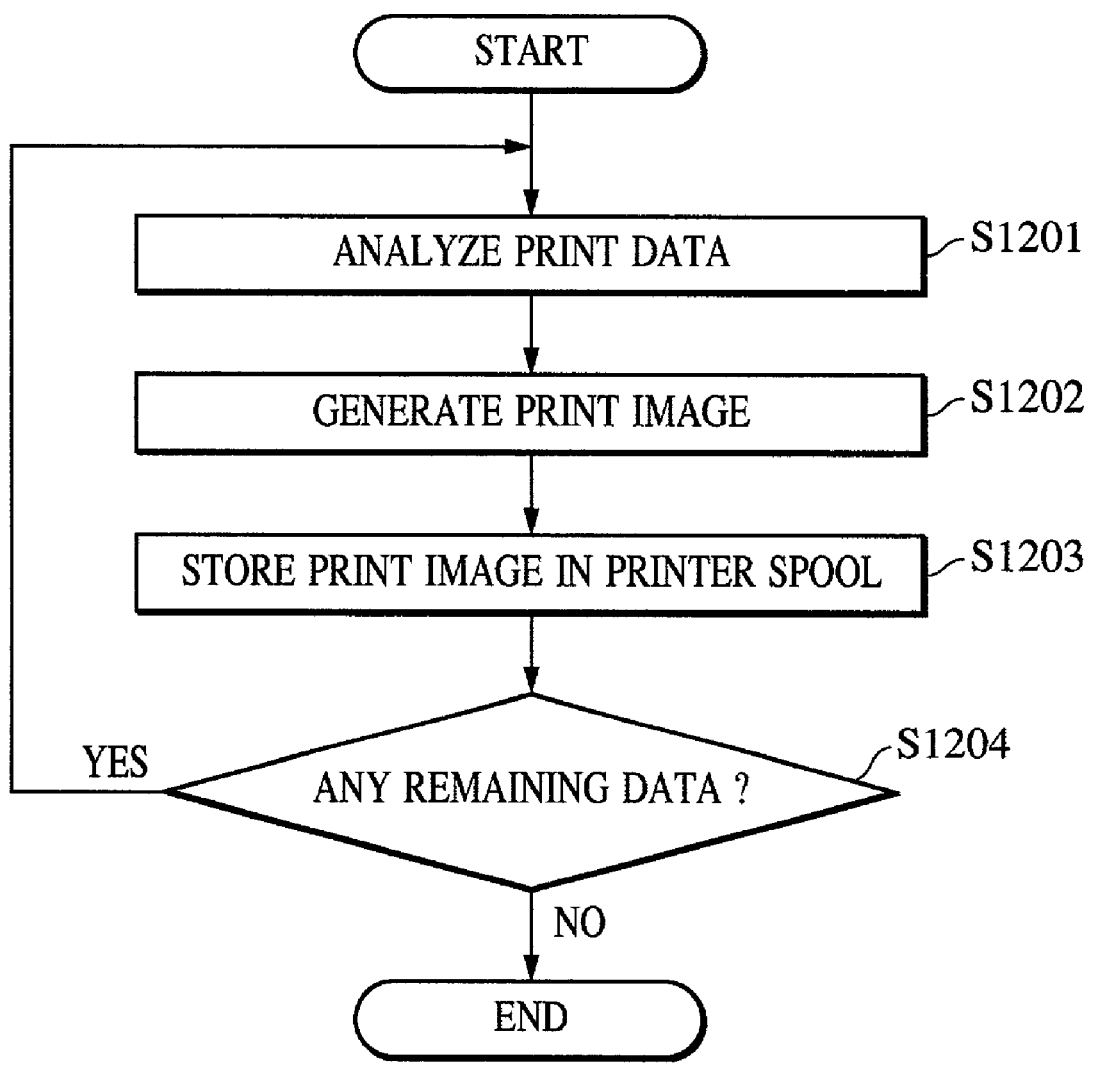
FIG. 12 is a flowchart showing a process performed by the print server in response to reception of the form print data transmitted from the server.

FIG. 12 is a flowchart showing a process performed by the print server 900 which has received the form print data transmitted from the server in step S1107.

In step S1201, the print output unit 903 analyzes the received form print data and detects a printer suitable for the received form print data. Since only one printer is shown in FIG. 9, the printer 904 is selected. Based on the analysis result, in step S1202, the print output unit 903 generates a print image that can be output by the printer 904. In step S1203, the print image is stored in a print spool. The printer 904 sequentially prints the print image. In step S1204, the process determines whether or not there is any remaining data to be analyzed. If the determination is affirmative, the process returns to step S1201. The above operation is repeated until the entirety of the received form print data is analyzed and is converted into print images.

Print Server Having a Plurality of Printers

Figure 13:
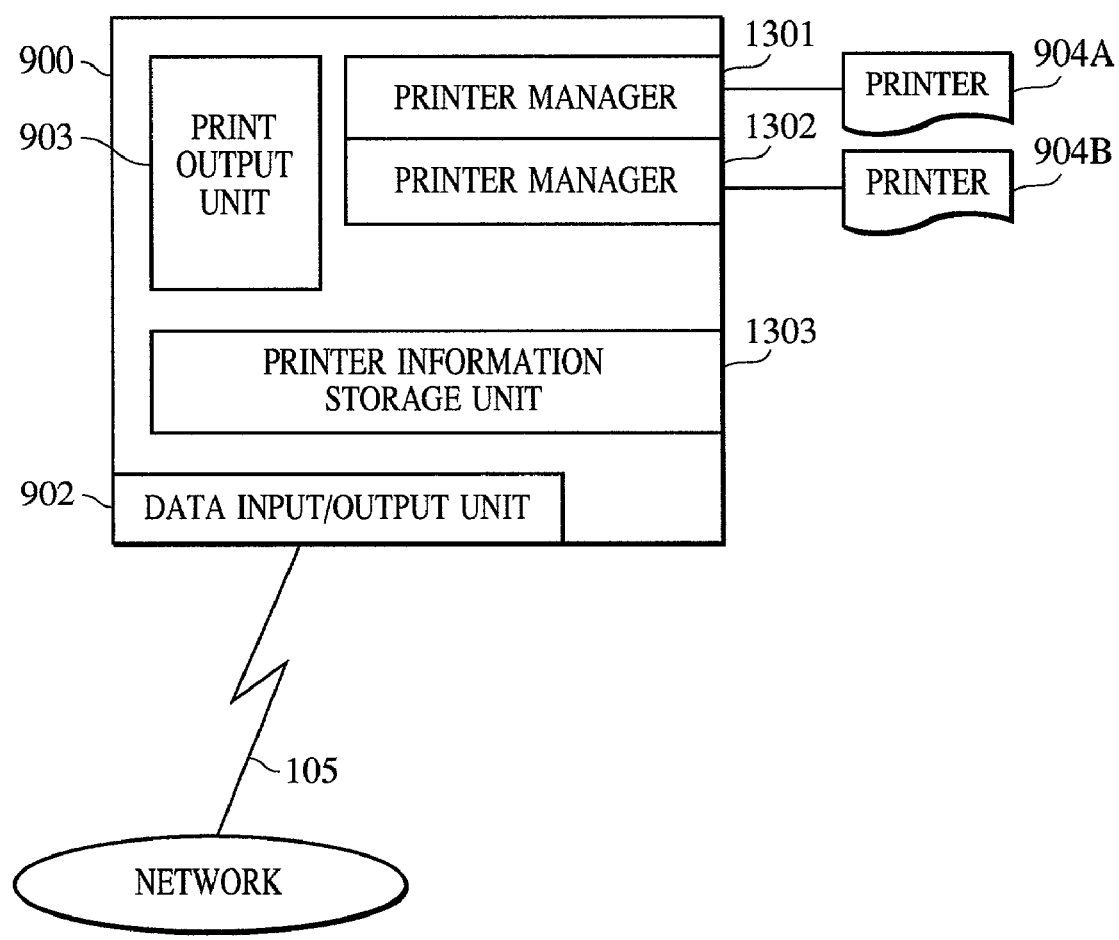
FIG. 13 is a function block diagram of the print server when a plurality of printers is available.

Although only one printer is shown in FIG. 9, the print server 900 may manage a plurality of printers. FIG. 13 is a function block diagram of the print server 900 which manages a plurality of available printers.

A printer information storage unit 1303 manages a list of printers. A printer manager 1301 manages communication with a printer 904A. A printer manager 1302 manages communication with a printer 904B. The printer managers 1301 and 1302 each have the functions of transmitting data to the corresponding printer and detecting the status of the printer.

The print output unit 903 has the function of checking data stored in the printer information storage unit 1303 corresponding to the printer name specified by the server and the function of selecting the printer manager to output data.

FIG. 14 shows a table managed by the printer information storage unit 1303. In the table, the name of each printer and the name of the corresponding printer manager are stored for each printer. Although names are used in FIG. 14, identification information such as the hardware identifier, port number, or address for uniquely identifying the printer and the printer manager can be used. In FIG. 14, the printer manager of the printer 904A is the printer manager 1301.

FIG. 15 illustrates a business activity page on which the printer can be selected. The page is similar to that shown in FIG. 2. The page shown in FIG. 15 differs from that shown in FIG. 2 in that the former includes a list 1502 for selecting the printer. The user selects one of boxes to specify the printer.

Figure 16:
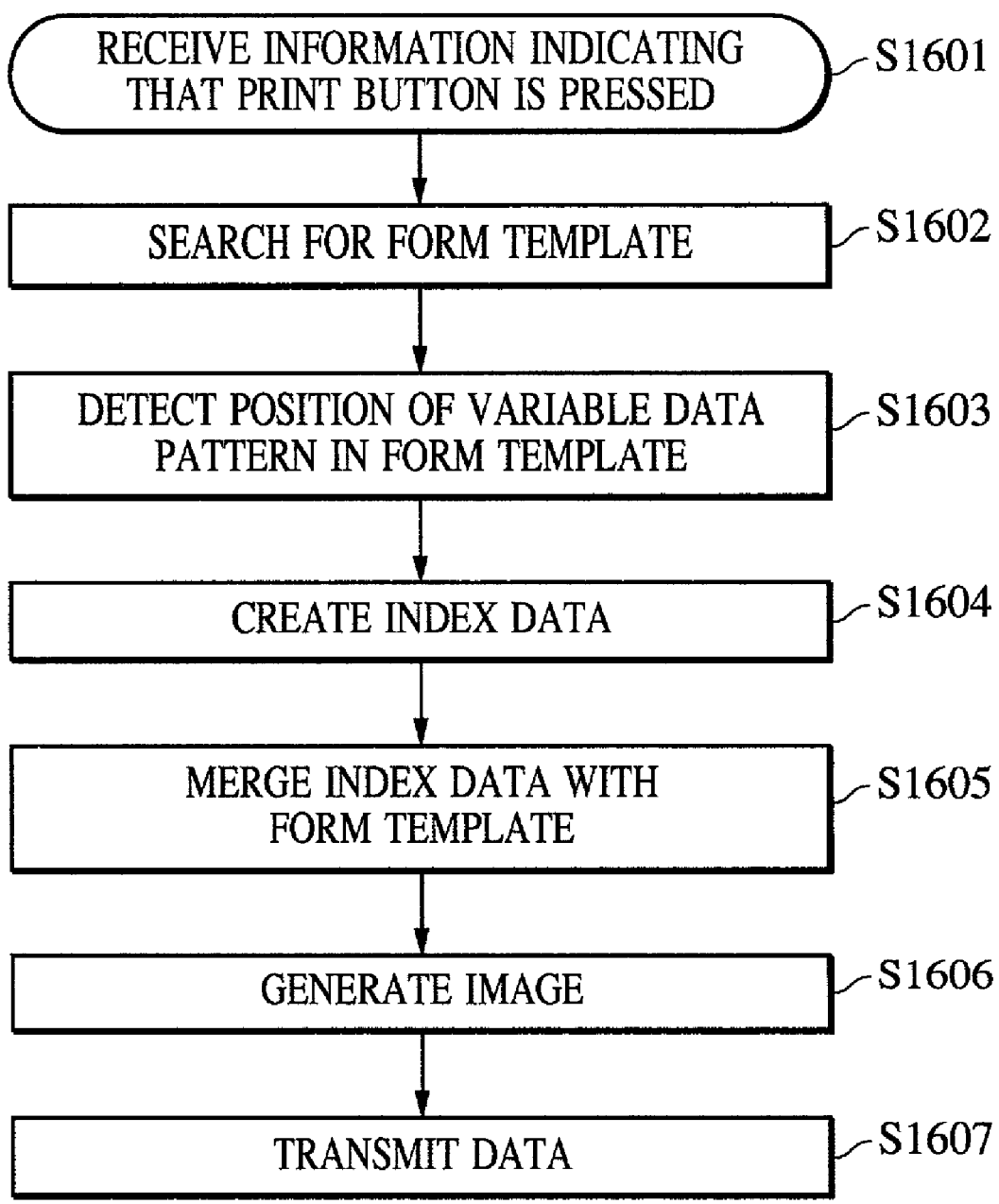
FIG. 16 is a flowchart of a process of generating form print data and transmitting the form print data by the server to the print server.

In such a form print system, the operation of the print server 900 when the print button 210 shown in FIG. 15 is pressed is described. FIG. 16 shows a process of generating form print data and transmitting the form print data by the server 106 to the print server 900. The process is performed by the server 106 when the server 106 receives, from the client 100, information indicating that the print button 210 is pressed. In the process, steps S1601 to S1604 are performed by the data processor 110; steps S1605 and S1606 are performed by the data manager 110; and step S1607 is performed by the network communication controller 106.

In step S1601, the server 106 receives information indicating that the print button 210 is pressed from the Web browser 101. At the same time, the server 106 also receives information indicating the printer selected by the user (for example, printer name). In step S1602, the process searches for a form template to be used. Since the identifier of the Web document which has already been transmitted to the client is stored, the form template to be used is retrievable based on the identifier.

In step S1603, the process detects the position at which variable data is to be embedded in the retrieved form template. In step S1604, the process creates index data. Specifically, the process writes the value of the variable data in the table shown in FIG. 5 so as to be adjusted to the position of the variable data, which is detected in step S1603, in accordance with the index. Thus, the index data in which the variable data portion is coded can be generated.

In step S1605, the image generator 111 merges the fixed data portions of the form template obtained in step S1602 with the index data generated in step S1604. From the data generated in step S1605, in step S1606, the image generator 111 creates form print data coded in an actual image format, that is, a format which can be analyzed by the print output unit 112.

In step S1607, the process transmits the form print data created in step S1606 and the printer name to the print server 900. The network communication controller 107 selects the printer server 900 in accordance with the client 100. For example, when there is a plurality of clients, a print server is set up for each client. In accordance with the setting, the print server is selected. FIG. 11 shows a table of the relationship between clients and print servers. In this table, the network address 1101 of each client and the network address 1102 of the corresponding print server are stored for each client.

When the information is received in step S1001, the data processor 110 determines the network address of the client 100 which has transmitted the information. Using the network address, the data processor 110 searches the table shown in FIG. 11 for the network address of the corresponding print server 900. In step S1007, the data processor 110 transmits the form print data based on the determined network address of the print server 900.

Figures 17, 18:
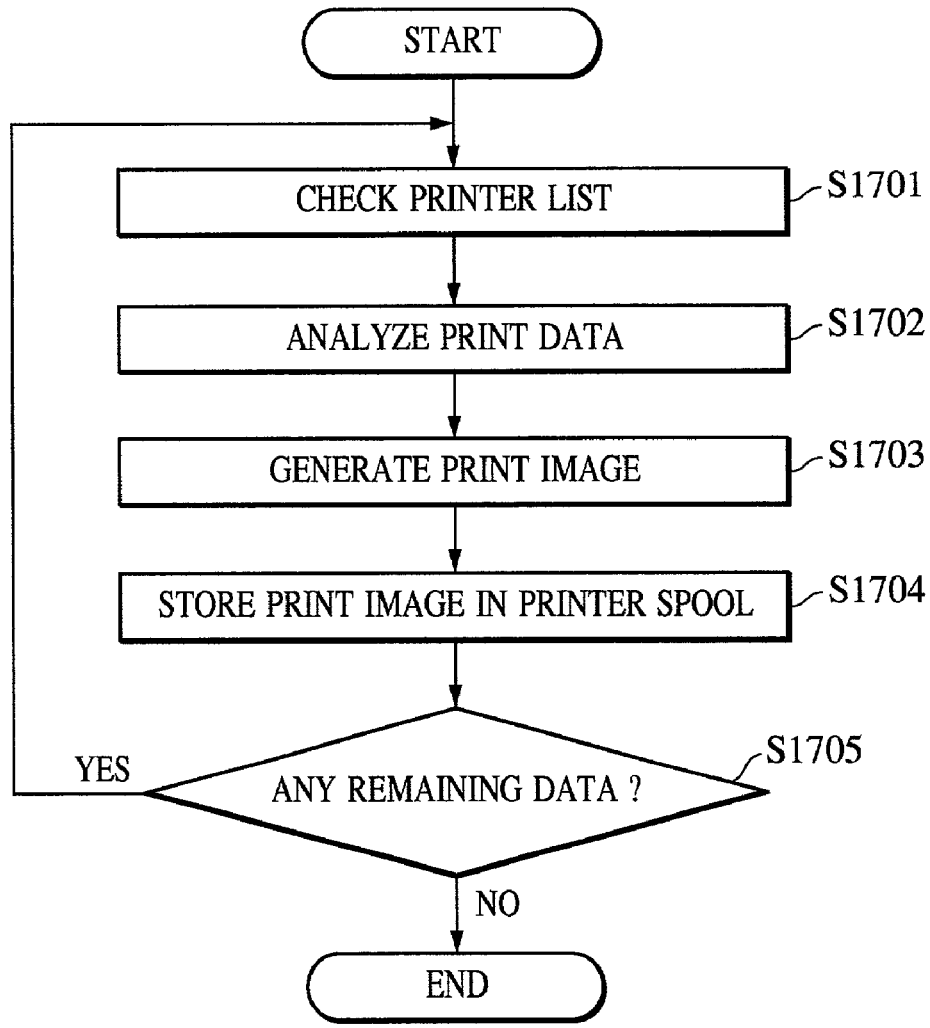
FIG. 17 is a flowchart of a process performed by the print server in response to reception of the form print data transmitted from the server.
FIG. 18 shows a table storing printer information.

FIG. 17 is a flowchart of a process performed by the print server 900 in response to reception of the form print data transmitted by the server 106 in step S1107 in FIG. 11.

In step S1701, the print output unit 903 checks the printer list shown in FIG. 14 based on the form print data and the received printer name and specifies the corresponding printer manager.

In step S1702, the corresponding printer manager analyzes the received form print data. In step S1703, based on the analysis result, the printer manager generates a print image that can be output by the corresponding printer. In step S1704, the print data is stored in a print spool. The print image is successively output by the printer. In step S1705, the process determines whether or not there is any remaining data to be analyzed. If the determination is affirmative, the process returns to step S1701. The above operation is repeated until the entirety of the received image data is analyzed and is converted into print images.

Alternatively, the status of each printer can be managed by the printer information storage unit 1303. FIG. 18 shows a table managed by the printer information storage unit 1303. In the table, the name of the printer, the name of the corresponding printer manager, and the status of the printer are stored for each printer. Although names are used in FIG. 18, identification information such as the hardware identifier, port number, or address for uniquely identifying the printer and the printer manager can be used. The printer status is information that indicates the usable state of each printer. In this example, "OK" indicates a usable state, and "NG" indicates an unusable state.

When the server 106 transmits the business activity page shown in FIG. 15 to the Web browser 101 running on the client 100, the server 106 obtains the status of each printer from the printer information storage unit 1303. The page is created so that only usable printers are selectable. The created page is transmitted to the Web browser 101 on the client 100. As shown in FIG. 15, the user selects a box of an available printer and presses the print button 210. In this way, the user cannot select a box of an unavailable printer.

Program Code and Recording Medium

Program code and related data according to the present invention are stored in a floppy disk or a CD-ROM and are supplied to a computer. FIG. 19 shows a memory map of a program according to the present invention, which is loaded into the memory 303 and which becomes executable by the CPU 302. The program code corresponding to the flowcharts shown in FIGS. 6 to 8, 10, 12, 16, and 17 is stored in the memory 303.

Figure 20:
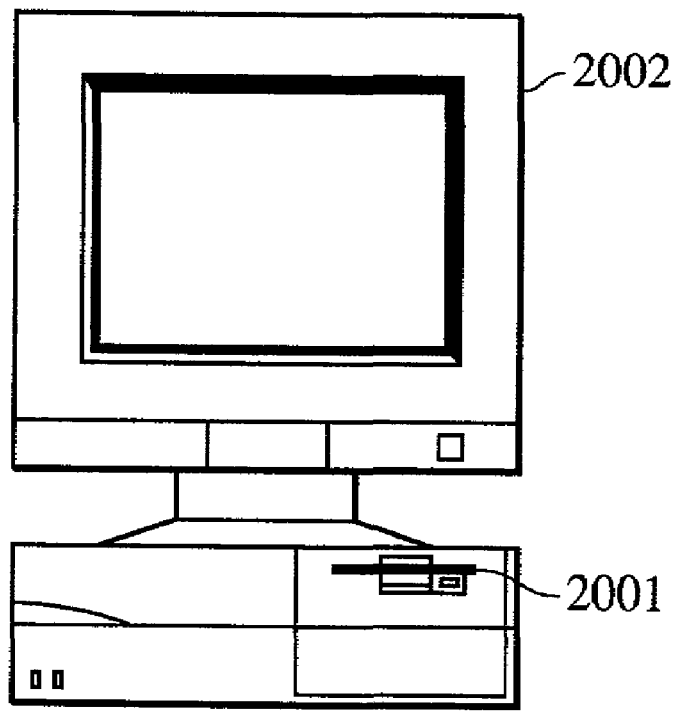
FIG. 20 illustrates a method of providing programs and data to a computer.
Figure 20:
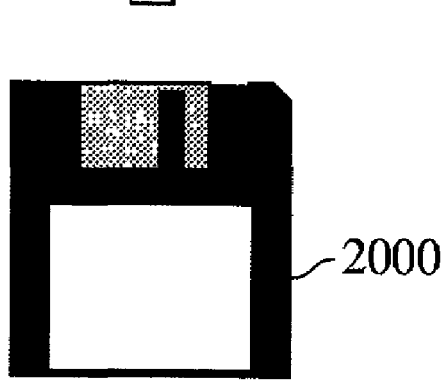

Referring to FIG. 20, the objects of the present invention can be achieved by supplying a storage medium (FIG. 19) having recorded therein program code of software (control program) for implementing the functions of the above embodiments in a computer, so that a unit (CPU 302) of the computer reads and executes the program code stored in the storage medium.

In general, as shown in FIG. 20, the program and data shown in FIG. 19 are stored in a floppy disk 2000, and the stored program and data are supplied to a computer 2002 through a floppy disk drive 2001. In this case, the program code read from the storage medium implements the functions of the embodiments, and the storage medium having stored therein the program code constructs the present invention.

Storage media for supplying the program code includes, for example, a floppy disk, a hard disk, an optical disk, a magneto-optical disk, a CD-ROM, a CD-R, a magnetic tape, a non-volatile memory card, and a ROM. When the computer executes the read program code, the functions of the embodiments are implemented. Alternatively, based on instructions of the program code, an operating system (OS) running on the computer can perform part of or the entirety of the actual processing, thereby implementing the functions of the embodiments. The program code read from the storage medium can be written in a memory provided in an add-on board inserted into the computer or an add-on unit connected to the computer. Based on instructions of the program code, a CPU or the like provided in the add-on board or the add-on unit performs part of or the entirety of the actual processing, thereby implementing the functions of the embodiments.

As described above, according to the present invention, print data generated by a server is directly transmitted from the server to a print server. Thus, it is unnecessary to set up the print function of converting distributed data into a printable format for each client. The cost of managing clients is minimized. Each client that has no print function can easily use the print system.

Since the server is not required to prepare and manage a plurality of printers, it is easy to add a printer or to change the printer.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus comprising:
   a receiving unit adapted to receive a request and template data including a reusable object, an index of a variable object and position data of the variable object from an external apparatus;
   a generation unit adapted to generate, in response to a received request from the external apparatus, print data corresponding to a preview displayed on a display screen on the external apparatus, wherein the generation unit generates print data by merging the reusable object in the template data and the variable object by using the reusable object, the index of the variable object and the position data of the variable object in the template data, and wherein the index of the variable object is extracted from the template data and the index of the variable object from the template data is used during the merging process;
   a selecting unit adapted to select a print server to transmit the generated print data from plural print servers, wherein the print server is selected in accordance with the external apparatus;
   an obtaining unit adapted to obtain instructions for printing via the display screen on the external apparatus; and
   a transmission control unit adapted to control transmission so that the print data generated by said generation unit is transmitted to a print server selected by the selecting unit in response to the obtaining unit for obtaining instructions for printing.

2. An information processing apparatus according to claim 1, further comprising:
   a specification unit adapted to specify a template for generating the print data and data to be inserted into the template,
   wherein said generation unit generates the print data based on the template and the data specified by said specification unit.

3. An information processing apparatus according to claim 1, wherein the display screen comprises a display screen displayed on a Web browser, and the request from the external apparatus is communicated between the Web browser on the external apparatus and a Web server on the information processing apparatus.

4. An information processing apparatus according to claim 1, further comprising:
   a determination unit adapted to determine, when the print server can transmit data to a plurality of printers, which printer is to be used to perform printing by analyzing the request from the external apparatus,
   wherein said transmission control unit controls transmission so that the print data and information designating the printer determined by said determination unit is transmitted.

5. A print system which includes an information processing apparatus and a print server for causing a printer to perform printing, comprising:
   a receiving unit adapted to receive a request and template data including a reusable object, an index of a variable object and position data of the variable object from an external apparatus;
   a generation unit adapted to generate, in response to a received request from the external apparatus, print data corresponding to a preview displayed on a display screen on the external apparatus, wherein the generation unit generates print data by merging the reusable object in the template data and the variable object by using the reusable object, the index of the variable object and the position data of the variable object in the template data, and wherein the index of the variable object is extracted from the template data and the index of the variable object from the template data is used during the merging process;
   a selecting unit adapted to select a print server to transmit the generated print data from plural print servers, wherein the print server is selected in accordance with the external apparatus;
   an obtaining unit adapted to obtain instructions for printing via the display screen on the external apparatus; and
   a transmission control unit adapted to control transmission so that the print data generated by said generation unit is transmitted from the information processing apparatus to a print server selected by the selecting unit in response to the obtaining unit for obtaining instructions for printing.

6. A print system according to claim 5, further comprising:
   a specification unit adapted to specify, in response to the request from the external apparatus, a template for generating the print data corresponding to the display screen displayed on the external apparatus and data to be inserted into the template,
   wherein said generation unit generates the print data based on the template and the data specified by said specification unit.

7. A print system according to claim 5, wherein the display screen comprises a display screen displayed on a Web browser, and the request from the external apparatus is communicated between the Web browser on the external apparatus and a Web server on the information processing apparatus.

8. A print system according to claim 5, further comprising:
a determination unit adapted to determine, when the print server can transmit data to a plurality of printers, which printer is to be used to perform printing by analyzing the request from the external apparatus,
wherein said transmission control unit controls transmission so that the print data and information designating the printer determined by said determination unit is transmitted.

9. An information processing method comprising:
a receiving step of receiving a request and template data including a reusable object, an index of a variable object and position data of the variable object from an external apparatus;
a generating step of generating, in response to a received request from the external apparatus, print data corresponding to a preview displayed on a display screen on the external apparatus, wherein the generating step generates print data by merging the reusable object in the template data and the variable object by using the reusable object, the index of the variable object and the position data of the variable object in the template data, and wherein the index of the variable object is extracted from the template data and the index of the variable object from the template data is used during the merging process;
a selecting step of selecting a print server to transmit the generated print data from plural print servers, wherein the print server is selected in accordance with the external apparatus;
an obtaining step of obtaining instructions for printing via the display screen on the external apparatus; and
a transmission step of controlling transmission so that the print data generated in said generating step is transmitted to a print server selected in the selecting step in response to the obtaining step for obtaining instructions for printing.

10. An information processing method according to claim 9, further comprising:
a specifying step of specifying a template for generating the print data and data to be inserted into the template,
wherein, in said generating step, the print data is generated based on the template and the data specified in said specifying step.

11. An information processing method according to claim 9, wherein the display screen comprises a display screen displayed on a Web browser, and the request from the external apparatus is communicated between the Web browser on the external apparatus and a Web server on the information processing apparatus.

12. An information processing method according to claim 9, further comprising:
a determining step of determining, when the print server can transmit data to a plurality of printers, which printer is to be used to perform printing by analyzing the request from the external apparatus,
wherein, in said transmission control step, transmission is controlled so that the print data and information designating the printer determined in said determining step is transmitted.

13. A computer-readable recording medium having stored therein a program for causing a computer to perform processing, the program comprising:
code for a receiving step of receiving a request and template data including a reusable object, an index of a variable object and position data of the variable object from an external apparatus;
code for a generating step of generating, in response to a received request from the external apparatus, print data which corresponds to a preview displayed on a display screen on the external apparatus, wherein the generating step generates print data by merging the reusable object in the template data and the variable object by using the reusable object, the index of the variable object and the position data of the variable object in the template data, and wherein the index of the variable object is extracted from the template data and the index of the variable object from the template data is used during the merging process;
code for a selecting step of selecting a print server to transmit the generated print data from plural print servers, wherein the print server is selected in accordance with the external apparatus;
code for an obtaining step of obtaining instructions for printing via the display screen on the external apparatus; and
code for a transmission control step of controlling transmission so that the print data generated in the generating step is transmitted to a print server selected in the selecting step in response to the obtaining step for obtaining instructions for printing.

14. A recording medium according to claim 13, wherein the program further comprises:
code for a specifying step of specifying a template for generating the print data and data to be inserted into the template,
wherein, in the generating step, the print data is generated based on the template and the data specified in the specifying step.

15. A recording medium according to claim 13, wherein the display screen comprises a display screen displayed on a Web browser, and the request from the external apparatus is communicated between the Web browser on the external apparatus and a Web server on the information processing apparatus.

16. A recording medium according to claim 13, wherein the program further comprises:
code for a determining step of determining, when the print server can transmit data to a plurality of printers, which printer is to be used to perform printing by analyzing the request from the external apparatus,
wherein, in the transmission control step, transmission is controlled so that the print data and information designating the printer determined in the determining step is transmitted.

* * * * *